No. 761,348. PATENTED MAY 31, 1904.
J. E. BAINES.
CHUCK FOR HOLDING SOCKETS.
APPLICATION FILED FEB. 8, 1902.
NO MODEL. 2 SHEETS—SHEET 2.
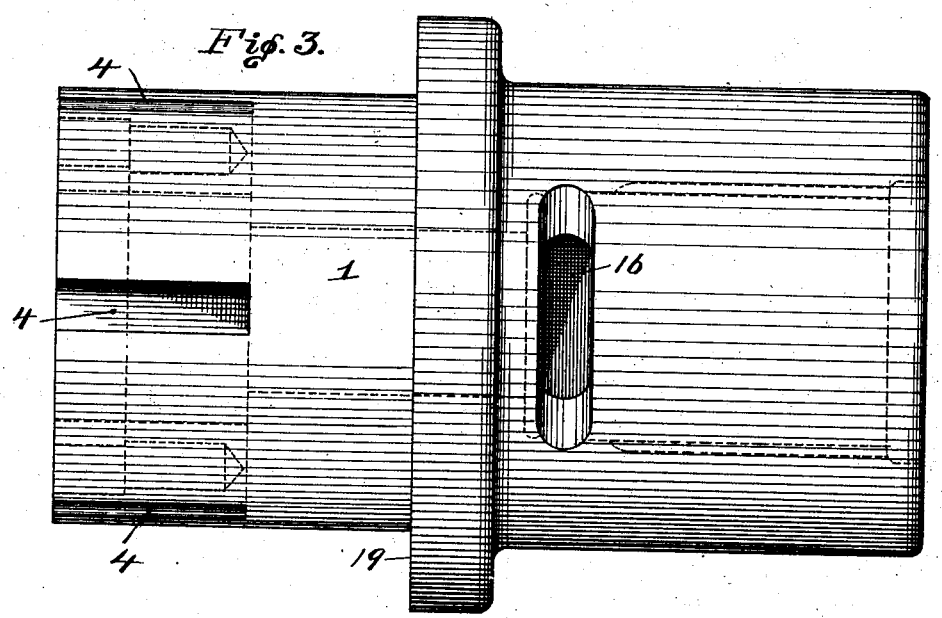
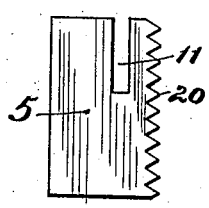
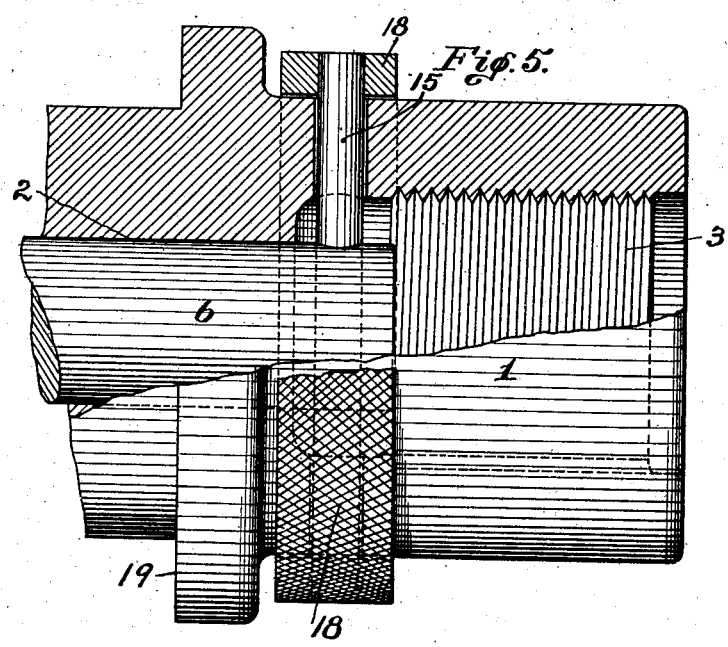

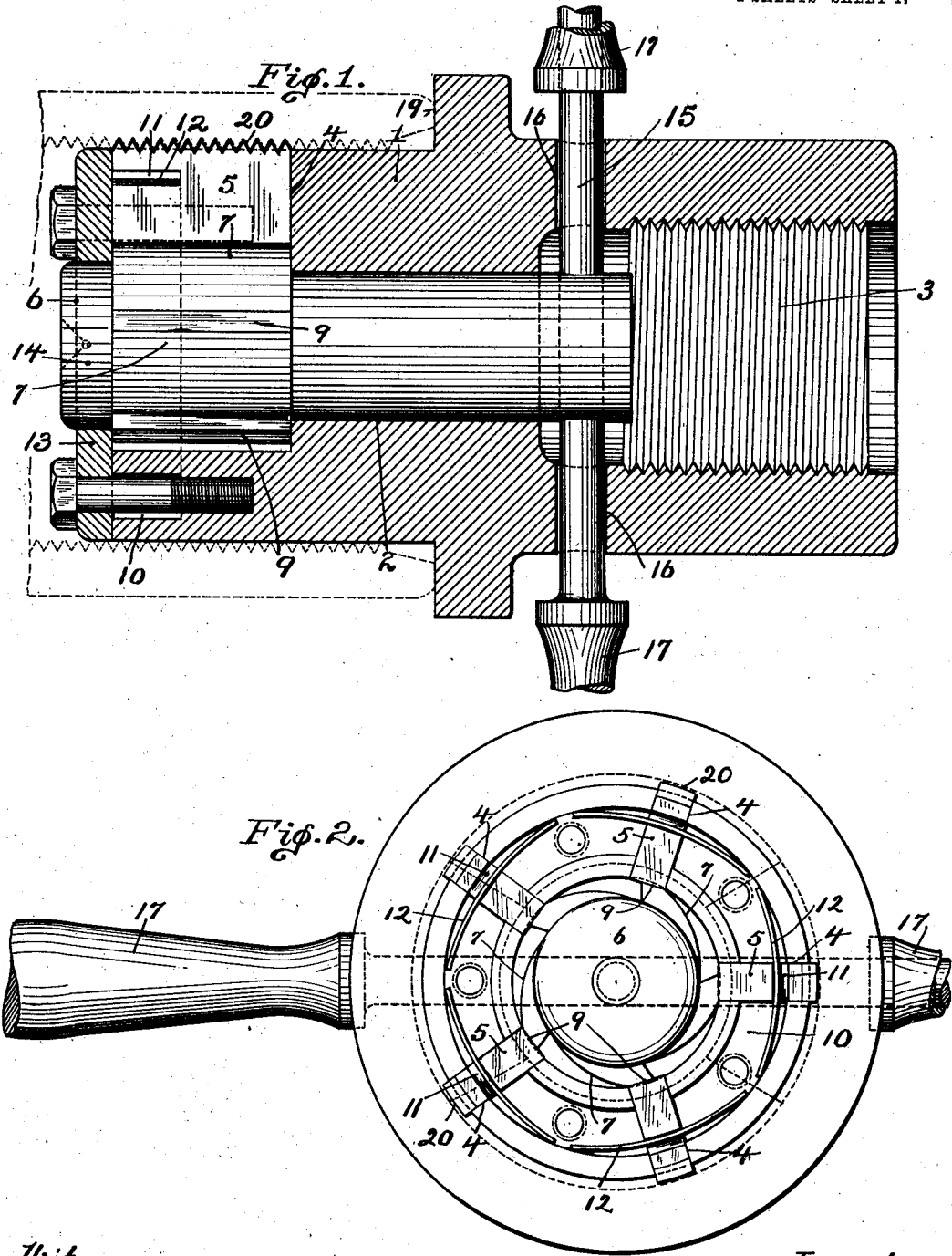

No. 761,348. Patented May 31, 1904.

UNITED STATES PATENT OFFICE.

JOSEPH E. BAINES, OF PITTSBURG, PENNSYLVANIA, ASSIGNOR TO NATIONAL TUBE COMPANY, OF PITTSBURG, PENNSYLVANIA, A CORPORATION OF NEW JERSEY.

CHUCK FOR HOLDING SOCKETS.

SPECIFICATION forming part of Letters Patent No. 761,348, dated May 31, 1904.

Application filed February 8, 1902. Serial No. 93,206. (No model.)

*To all whom it may concern:*

Be it known that I, JOSEPH E. BAINES, a resident of Pittsburg, in the county of Allegheny and State of Pennsylvania, have invented a new and useful Improvement in Chucks for Holding Sockets; and I do hereby declare the following to be a full, clear, and exact description thereof.

My invention relates to chucks for holding pipe sockets or couplings while finishing the end faces thereof and counterboring the same. Its object is to provide a chuck for this purpose whereby the sockets can be quickly chucked and unchucked, held firmly while being faced and counterbored, and whereby the threads in the threaded socket will not be mutilated or defaced.

In the manufacture of pipe couplings and sockets after they have been shaped and welded they are threaded internally. The end faces must then be turned down to remove any burs or inequalities thereon, and the threads at both ends are removed by counterboring for a short distance to form an enlarged blank inner surface which will permit the socket being screwed onto the pipe to such an extent that the threads on the pipe where they run out will be entirely covered up. My chuck is intended to hold the sockets while the end faces are being finished and the counterboring performed. The chuck is intended, primarily, for holding sockets which have already been threaded; but it is also adapted for holding sockets which are not threaded or, in fact, any tubular articles.

In the accompanying drawings, Figure 1 is a longitudinal section through my improved chuck. Fig. 2 is a front end view of the same. Fig. 3 is a side view of the body thereof. Fig. 4 is a detailed view of one of the holders; and Fig. 5 is a side view, partly in section, of a modification.

The chuck comprises a suitable body which is adapted to be secured to the spindle of a lathe or similar machine and a holding device for the socket mounted in said body, together with means for causing said holding devices to engage with and to be disengaged from the socket or other tubular article. The body is preferably formed by casting, although it may be forged, and it is provided with an axial bore. This body at one end must be provided with suitable means for attaching the same to the spindle of the lathe or other machine, and for this purpose I have shown the bore 2 enlarged and provided with screw-threads 3, so that the body can be screwed onto the spindle of the lathe.

At the forward end the body is provided with a series of radial slots 4, which intersect the axial bore 2. Five such slots are shown on the drawings; but the number may be varied as desired or necessary. In these slots are mounted the holders or gripping devices 5, which, as shown, are composed of substantially rectangular blocks of steel or other hard metal and are adapted to be projected radially outwardly to engage the inner walls of the socket or other tubular article which is placed over the forward end of the chuck. Various means for projecting these holders outwardly may be employed, and I have shown for this purpose a rotating block 6, which is mounted in the axial bore 2 and which is provided with a series of cam-faces 7, corresponding in number to the holders 5. By rotating this plug the holders will be thrust outwardly, as will be readily understood. To prevent the backward rotation of this plug, and thus release the grip of the holders 5 on the socket, I flatten off the ends of the cam-faces 7, as shown at 9, so that when the holders have been fully thrust out their inner ends will bear against these flattened faces, which will form a sufficient lock to prevent the plug from rotating and releasing the grip on the socket.

To unchuck the socket, the plug will be rotated in the opposite direction and the reaction will in most cases cause the holders to lose their grip on the socket; but to insure this release, and especially with sockets which are internally threaded, I provide suitable means for moving the holders inwardly when they are released by the cams 7. Various means for this purpose may be used; but I prefer to use a spring or springs, and as a convenient means for applying the same I have shown the end of the body provided with an annular groove 10, and each of the holders is provided with a slot 11 therethrough, extending, preferably, in from the end thereof, as shown. Arranged in the groove 10 and extending through the slots 11 in the holders are a series of flat springs 12, which when the holders are in their innermost position will be practically straight; but when said holders are thrust outwardly they will become bowed, as shown in Fig. 2, and will be under tension, so that they will retract the holders as soon as they are released by the cams 7. A face-plate 13, having a central perforation, is suitably secured to the end of the body and closes the annular grooves 10, thus preventing displacement of the holders and springs. The plug 6 is provided with a circular portion 14, fitting in the central opening in the face-plate, so that said face-plate also holds this plug in position and steadies the forward end thereof.

Any suitable means may be applied for rotating the plug 6, and I have shown for this purpose a bar or rod 15, suitably secured to said plug, preferably by passing through an opening therein, as shown, and extending out through slots 16 in the walls of the body. To the outer ends of this rod are secured suitable handles or gripping devices. In Fig. 1 the ends of the rods are provided with ordinary handles 17. This arrangement is suitable for holding large-sized sockets; but with small-sized sockets the rapidity of rotation of the chuck will be such that it may be inconvenient to seize these handles, and consequently for the smaller-sized chucks I prefer to secure to the rod 15 a sleeve 18, as shown in Fig. 5, which surrounds the body of the chuck and can be conveniently grasped by the operator no matter how rapidly the chuck may be rotating. The body is also preferably provided with the shoulder 19, which will be so located as to have the end of the socket being operated on abut against the same.

The holders 5 are preferably provided with serrated outer edges 20, these serrations being, in effect, screw-threads, the object of this being to prevent the defacement or mutilation of the screw-threads in a tapped socket. These serrations are cut across the holders on a slight incline depending upon the pitch of the thread in the socket, and the threads on the several holders will be so arranged that they will form portions of a continuous thread. These threads or serrations therefore enable a threaded socket to be held without mutilation of the threads; but they do not prevent the holders from gripping an unthreaded socket. In fact, they increase the gripping effect of the holders.

In the use of my chuck it is attached to the spindle of the lathe or other machine by the screw-threads 3, and a socket will be slipped over the forward end of said chuck. The plug 6 will then be rotated by the handle 17 or sleeve 18, thereby forcing the holders 4 outwardly against the inner face of the socket. The outer end of the socket will then be faced off and counterbored by suitable tools in the usual way, after which the plug 6 will be rotated in the opposite direction, and the springs 12 will disengage the holders from the socket. The sockets can be chucked and unchucked very quickly and without stopping or slowing up the spindle of the lathe.

What I claim as my invention, and desire to secure by Letters Patent, is—

In a chuck for holding sockets or the like, the combination with a body having an axial bore with radial slots intersecting the same, said body also having an annular groove in its end face intersecting said radial slots, of holders in said slots adapted to project outside the body, said holders being provided with slots in their outer ends, springs arranged in the annular groove of the body and lying in the end slots of the holders for moving them inwardly, a rotating plug in the bore having cam-faces arranged to bear against said holders and force them outwardly, and a face-plate secured to the end of the body for closing the annular groove therein.

In testimony whereof I, the said JOSEPH E. BAINES, have hereunto set my hand.

JOSEPH E. BAINES.

Witnesses:
F. W. WINTER,
ROBERT C. TOTTEN.